(12) United States Patent
Maschke et al.

(10) Patent No.: US 11,374,450 B2
(45) Date of Patent: Jun. 28, 2022

(54) MAGNETIC ELEMENT HOLDING DEVICE

(71) Applicant: ebm-papst Mulfingen GmbH & Co. KG, Mulfingen (DE)

(72) Inventors: Matthias Maschke, Kupferzell (DE); Friedrich Schaffert, Schrozberg (DE); Sebastian Hoss, Bad Mergentheim (DE); Tobias Schmidt, Ahorn-Schillingsstadt (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 163 days.

(21) Appl. No.: 16/600,836

(22) Filed: Oct. 14, 2019

(65) Prior Publication Data

US 2020/0044502 A1 Feb. 6, 2020

Related U.S. Application Data

(63) Continuation of application No. PCT/EP2018/056681, filed on Mar. 16, 2018.

(30) Foreign Application Priority Data

May 3, 2017 (DE) ...................... 10 2017 109 494.6

(51) Int. Cl.
*H02K 1/27* (2006.01)
*H02K 1/28* (2006.01)
*H02K 1/2786* (2022.01)
*H02K 1/17* (2006.01)

(52) U.S. Cl.
CPC ............. *H02K 1/2786* (2013.01); *H02K 1/17* (2013.01); *H02K 1/28* (2013.01)

(58) Field of Classification Search
CPC .... H02K 1/2786; H02K 1/17; H02K 2213/12; H02K 1/28
See application file for complete search history.

(56) References Cited

U.S. PATENT DOCUMENTS

| 2,513,227 A | 6/1950 | Wylie | |
| 2006/0091752 A1* | 5/2006 | Adaniya | ............ H02K 21/025 310/156.16 |

FOREIGN PATENT DOCUMENTS

| DE | 1 082 665 B | 6/1960 | |
| JP | S50-68807 U | 6/1975 | |
| JP | S56-86883 U | 7/1981 | |
| JP | S59-44170 U | 3/1984 | |
| JP | 2009512413 A * | 3/2009 | ............ H02K 1/278 |
| WO | WO 2015179966 A * | 12/2015 | ............ H02K 1/2786 |

OTHER PUBLICATIONS

Machine Translation, Ahrens, JP 2009512413 A, Mar. 2009. (Year: 2009).*
International Search Report dated Jun. 1, 2018 in corresponding PCT Application No. PCT/EP2018/056681.

* cited by examiner

*Primary Examiner* — Thomas Truong
(74) *Attorney, Agent, or Firm* — Harness, Dickey & Pierce, P.L.C.

(57) ABSTRACT

A magnetic element holder (1) of an electric motor has a carrier formed as a frame structure. The carrier has at least one receiving section (2) to receive at least one magnetic element (6). The carrier is configured with a holding device (3) for positionally fixed holding the at least one magnetic element (6) inside the at least one receiving section (2). The magnetic element holder (1) is configured to be fastened to a rotor (100) of an electric motor.

19 Claims, 3 Drawing Sheets

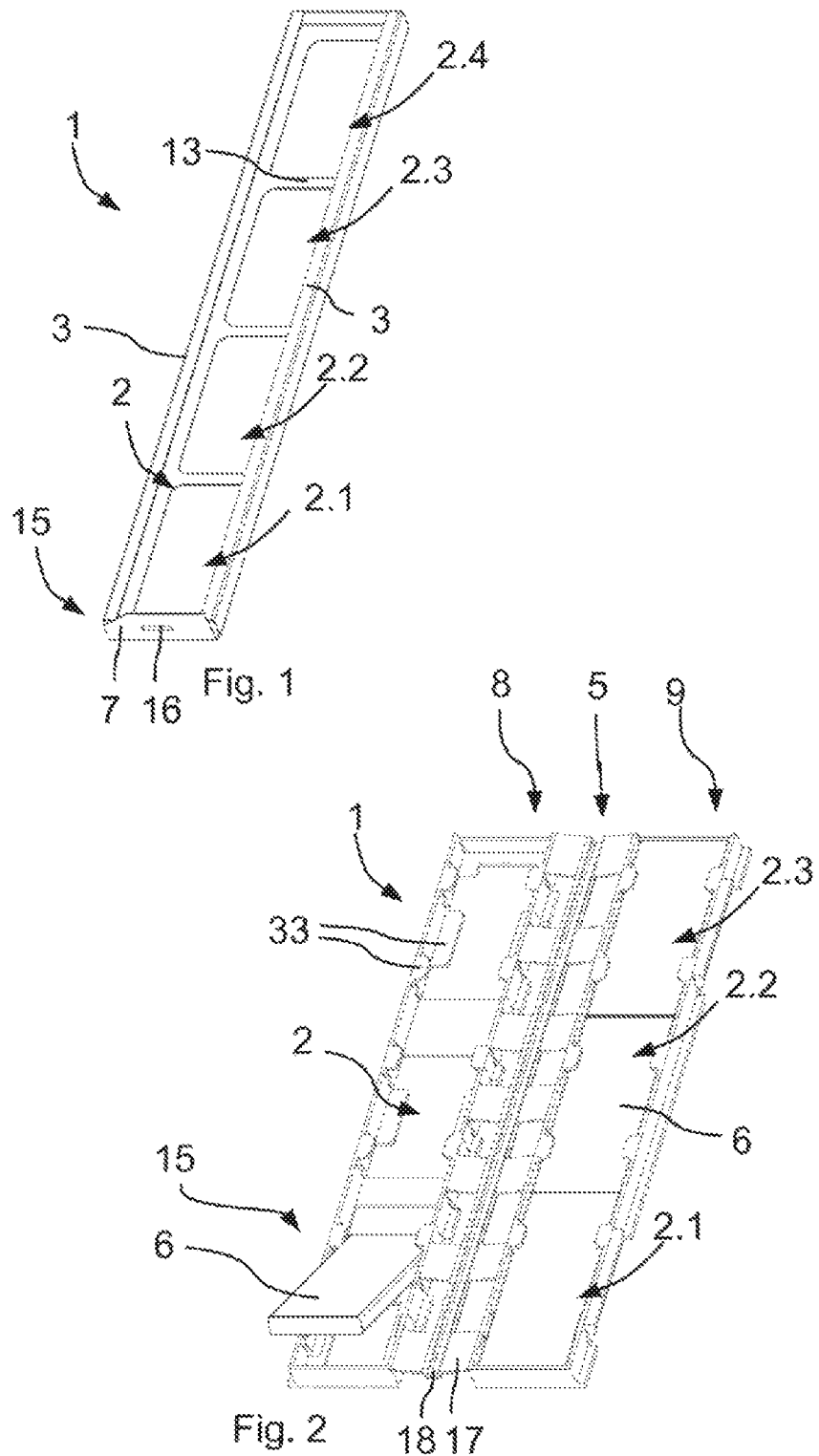

MAGNETIC ELEMENT HOLDING DEVICE

CROSS-REFERENCE TO RELATED APPLICATIONS

This application is a continuation of International Application No. PCT/EP2018/056681, filed Mar. 16, 2018, which claims priority to German Application No. 10 2017 109 494.6, filed May 3, 2017. The disclosures of the above applications are incorporating herein by reference.

FIELD

The disclosure relates to a magnetic element holder of an electric motor and to a rotor of an electric motor with at least one magnetic element holder.

BACKGROUND

Various solutions of positioning and fastening magnets in the rotor of electric motors are common. For example, the magnets are often glued to the inner wall of the rotor in external rotor motors. But this involves a great assembly effort. In addition, errors in positioning and selecting permanent magnets are not excluded. This results in an incorrect alignment of the individual magnetic elements. A magnetic element that is incorrectly glued can only be corrected with increased effort.

SUMMARY

It is therefore an aspect of the disclosure to provide a magnetic element holder that enables preassembly of the magnetic elements. The preassembly can then be fastened to the rotor as a whole. The magnetic element holder must also be fixably positioned in the rotor.

This problem is solved by the combination of features according to a magnetic element holder for an electric motor comprising a carrier formed of a frame structure. The carrier comprises at least one receiving section to receive at least one magnetic element. It is configured with a holder for positionally fixed holding of the at least one magnetic element inside the at least one receiving section. The magnetic element holder is configured to be fastened to a rotor of an electric motor. The magnetic element holder has at least one spring element on its outer edge. A bias can be generated with respect to a magnetic element holder adjacently positioned on the outer edge.

According to the disclosure, a magnetic element holder with a carrier is formed as a frame structure. The carrier comprises at least one receiving section to receive at least one magnetic element. The magnetic element holder further includes a holding device for positionally fixed holding of the at least one magnetic element inside the at least one receiving section.

According to the disclosure, the magnetic element holder further includes, on its outer edge, at least one spring element. A bias is generated with respect to a magnetic element holder positioned adjacently on the outer edge.

The magnetic elements can be inserted into the receiving section of the magnetic element holder. They are fixed there using the holding device. It is therefore possible to install the magnetic elements in the magnetic element holder outside the rotor and readily prepare them for operation in correct alignment. The spring element on the outer edge can be used to bias the magnetic element holder with respect to another adjacently positioned magnetic element holder. Thus, their positioning to each other is fixable. Furthermore, the spring element can be used to tension the magnetic element holder against the inner wall of the rotor when multiple magnetic element holders are interconnected and placed onto the inner wall of the rotor.

The spring element bias also contributes to the correct final positioning of the magnetic element holder inside the rotor during assembly and when it is in operation.

In an advantageous embodiment, the magnetic element holder is configured as a modular unit. Multiple respective modules can be interconnected and then fastened together. The spring elements, disposed on the outer edge, extend between the individual modules and bias them against each other. A ring of magnetic element holders can be produced from individual modules. The ring can then be inserted into the rotor, preferably onto its rotating inner wall.

In an exemplary embodiment of the magnetic element holder, the receiving section comprises multiple receiving pockets. The pockets are disposed in an axial row to each other. Each pocket is configured to receive a magnetic element. Depending on the size of the rotor and the output of the electric motor, multiple magnetic elements can be installed in each individual magnetic element holder. The individual magnetic elements are positioned and fixed in an axial row in respective associated receiving sections.

In another variant of the magnetic element holder, it may comprise multiple parallel row sections. Each section has at least one receiving section for at least one magnetic element. The row sections are spaced apart from each other. This solution is aimed at a multi-row configuration of the magnetic element holder. Each row section is intended to occupy a peripheral section in the rotor. This spaced apart arrangement in the row section is therefore in a direction that matches the peripheral direction in the rotor. Each row section comprises at least one magnetic element. However, each row section may alternatively have multiple receiving pockets disposed in an axial row as described above.

In a further developed embodiment of the magnetic element holder with row sections, the row sections are interconnected by the at least one spring element.

In another embodiment, a hinge can be disposed or configured, either in addition or alternatively, between the row sections. Thus, the row sections can be moved to be inclinable relative to each other. This inclination can be used to align the individual row sections in the peripheral direction inside the rotor.

The holding device for positionally fixed holding of the respective magnetic element in the respective receiving section of the magnetic element holder is in one embodiment configured as a snap-in connector. The respective magnetic element can be inserted and latched into it. The correct position can be achieved by a stop on the connector. The respective magnetic element can be inserted and stopped by a fixing device, for example a snap-in latch.

In a favorable embodiment, a one-piece spring element is formed on the magnetic element holder. Furthermore, an embodiment is advantageous where the spring element has a wave form at least in regions of its cross section. The wave form can be partially elastically compressed and stretched along the wave flow. A sheet metal profile. In a solution made of plastic, a respectively undulated blade can be used as the spring element. Furthermore, grooves that extend perpendicular to the compression direction (a direction extending between adjacent magnetic element holders), can be provided in the spring element to increase flexibility and elasticity.

In another favorable embodiment, the spring element extends substantially along an entire edge side length of the magnetic element holder. The edge side length substantially matches the axial length of the interior of the rotor into which the magnetic element holder is inserted. The extension of the spring element ensures a constant bias along the entire axial length of the magnetic element holders, with respect to each other, and thus their correct alignment.

A further developed embodiment of the magnetic element holder includes a tongue. The tongue is disposed on the front face and can be moved or bent into its position. The tongue can be used to close the adjacent receiving section on the front face.

In a further embodiment, a magnetic element insertion section is provided at the magnetic element holder. The insertion section can be used to insert the magnetic element (s) into the receiving section(s). The magnetic element insertion section forms the front face receiving section. Thus, it can be closed by the tongue after all magnetic elements have been inserted into the magnetic element holder. In an exemplary embodiment, the magnet element insertion section further comprises an asymmetric cross section on its front face. This can ensure a constructive magnetic field orientation. Thus, this accomplishes correct insertion of the permanent magnets into the respective magnetic element holder.

Alternatively or in addition, the tongue in a further developed embodiment of the magnetic element holder comprises an optical indicator (e.g. +, −) for the magnetic field orientation of the magnetic element.

The disclosure further includes a rotor of the electric motor with a plurality of magnetic element holders described above. The plurality of magnetic element holders are disposed and fastened adjacent to each other in the peripheral direction on an inner wall of the rotor.

In one embodiment, for fixing purposes, the plurality of magnetic element holders are at least partially glued to the inner wall of the rotor. Since the entire magnetic element holder is glued instead of individual magnetic elements, positioning of the magnetic elements is easier to achieve and ensure.

In an advantageous variant, the plurality of magnetic element holders are connected to a circular unit in a peripheral direction. The plurality of magnetic element holders are inserted as a whole along the inner wall into the rotor. Accordingly, assembly can be performed in advance and completely outside of the rotor. The circular unit can be inserted into the rotor biased in the peripheral direction against the spring elements. Thus, a biasing force can be applied to the inner wall of the rotor.

A spring element may be disposed between each of the magnetic element holders. The circular unit, as a whole, is inserted in a single step with the magnetic element holders biased by the spring elements.

Other advantageous further developments of the disclosure are characterized in the dependent claims or are explained in more detail below with reference to the figures and together with a preferred embodiment of the disclosure.

DRAWINGS

The drawings described herein are for illustrative purposes only of selected embodiments and not all possible implementations, and are not intended to limit the scope of the present disclosure.

FIG. 1 is a perspective view of a single-row embodiment of a magnetic element holder.

FIG. 2 is a perspective view of a multi-row embodiment of a magnetic element holder.

DETAILED DESCRIPTION

Figure 3:
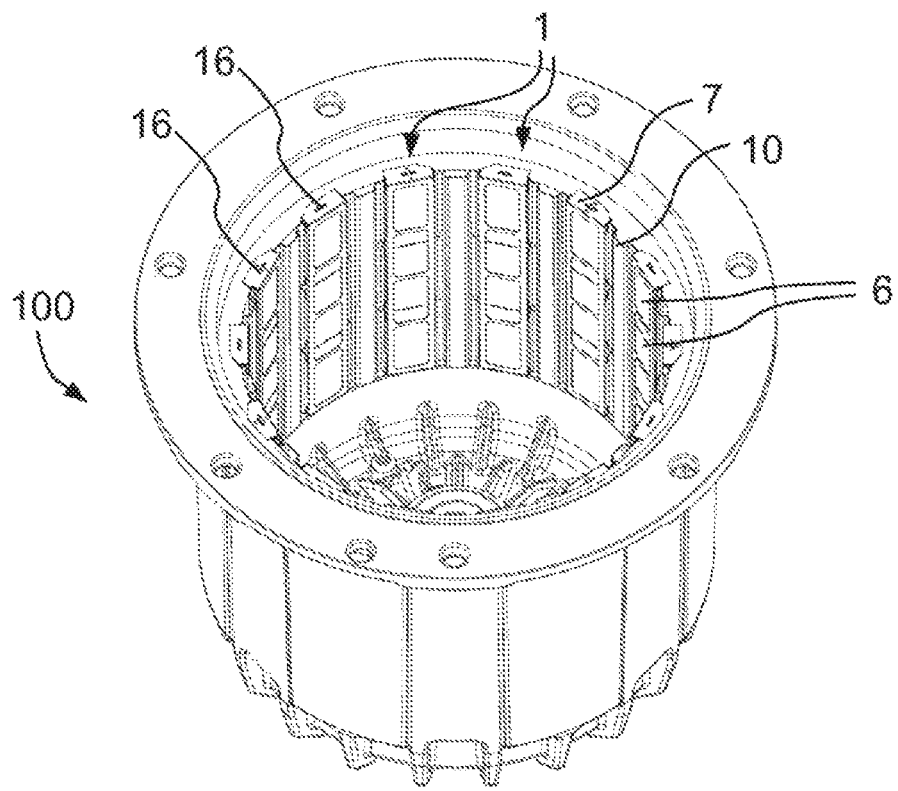
FIG. 3 is a perspective view of a rotor with an inserted plurality of single-row magnetic element holders.

Like reference symbols identify like components in all views.

FIG. 1 illustrates a perspective view of a magnetic element holder 1 of a modular design for insertion into a rotor, particularly an external rotor of an electric motor. The magnetic element holder 1 is implemented by a carrier formed from a frame structure. It includes a receiving section 2 to receive magnetic elements 6 (see FIG. 3). In the variant shown, the receiving section 2 includes four receiving pockets 2.1, 2.2, 2.3, 2.4 disposed in an axial row. Each pocket 2,1, 2.2, 2.3, 2.4 can receive one magnetic element 6. For the sake of clarity, the magnetic elements 6 are not shown in FIG. 1. Each receiving pocket 2.1, 2.2, 2.3, 2.4 is separated from the next by struts 13. Otherwise, the side surfaces are free. Thus, the magnetic elements 6 remain completely uncovered by the magnetic element holder 1 and unfold their full effect.

A holding device formed by engaging holding webs 3 are provided on the frame structure of the magnetic element holder 1. The webs 3 lock the magnetic elements 6 in position within the receiving pockets 2.1, 2.2, 2.3, 2.4 of the receiving section 2.

A magnetic element insertion section 15 is provided on one of the end faces of the magnetic element holder 1. The insertion section 15 end face edge section is open relative to the frame structure. Thus, the magnetic elements 6 can be inserted one after the other from the end face. The axial length of the receiving section 2 matches that of four standard-size magnetic elements 6.

A tongue 7, disposed on the end face, can be used to close the magnetic element insertion section 15. Thus, it closes the magnetic element holder 1. The tongue 7 can be bent about an edge axis for this purpose. FIG. 1 shows the closed state of the tongue 7. The tongue 7 further comprises an optical indicator 16 (shown here as a minus (−)). This indicates the magnetic field orientation of the magnetic elements 6 of the magnetic element holder 1.

FIG. 3 shows the use of the magnetic element holder 1 from FIG. 1. A plurality of the magnetic element holders 1 are adjacently disposed in the peripheral direction on an inner wall of a rotor 100. They are fastened together and glued to the inner wall of the rotor 100, for example. The plurality of magnetic element holders 1 is interconnected into a circular unit in the peripheral direction. It is inserted as a whole along the inner wall into the rotor 100.

Spring elements 10, which bring the individual magnetic element holders 1 into a biased state, are disposed between each two adjacent magnetic element holders 1. The spring elements 10 can be a single-part or integral component of each magnetic element holder 1. It can be attached to it as an additional component. Each of these spring elements 10 extends along the complete axial edge side length of the respective magnetic element holder 1. The edge side length extends parallel to the axis of the rotor 100.

Figure 4:
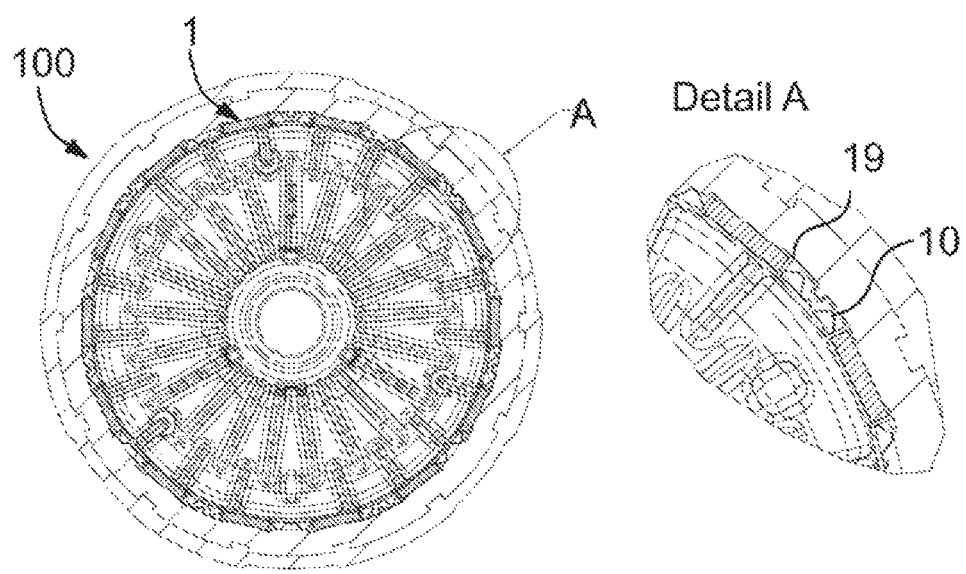
FIG. 4 is a plan view and a plan detail view A of the rotor of FIG. 3.

In the plan view and associated detail view in FIG. 4, it is readily visible that the spring elements 10 have a wave form in some regions. The spring elements 10 can be partially elastically compressed and stretched, at least along their wave flow. The extension between two adjacent magnetic element holders 1, for example, is formed by a sheet metal part.

The magnetic element insertion section 15, of the respective magnetic element holders 1, is the section facing upwards in the direction of the rotor opening in the embodiment shown. It has an asymmetric cross section 19 on its front face to provide a design solution for determining the magnetic field orientation.

FIG. 2 discloses an alternative solution of the magnetic element holder 1 in a two-row design. Here, the magnetic element holder 1 comprises multiple row sections. In this embodiment, there are two parallel row sections 8, 9. Each row section has a receiving section 2. Each section receives three magnetic elements 6. The row sections 8, 9 are spaced apart from each other transversely to the axial direction. A hinge 5 is provided between the two row sections 8, 9, respectively. The two row sections 8, 9 can be inclined relative to each other by the hinge 5. The hinge 5 is formed by a plurality of connecting legs 17. The connecting legs 17 mutually face each another on either side. A duct 18 extends in the axial direction between the connecting legs 17 to connect the same. The duct is at least partially elastic. It ensures the inclinability of the two row sections 8, 9.

Projecting holding webs 33 are provided as the holding device on the frame structure of the magnetic element holder 1 according to FIG. 2. The webs lock three magnetic elements 6 in position within the receiving pockets 2.1, 2.2, 2.3 of the receiving section 2. The webs 33 prevent the magnet elements 6 from falling out. Furthermore, a snap-in connector not shown here can be provided. The magnetic elements snap into a predetermined position inside the receiving pockets. Thus, they are fixed in the receiving section. In the embodiment shown, the row section 9 on the right side is completely filled with three magnetic elements 6. In the row section 8 on the left side, the insertion of the first out of three magnetic elements 6 into the magnetic element insertion section 15 is outlined by tilted insertion. When fully filled, the row section 8 matches the row section 9.

Figure 5:
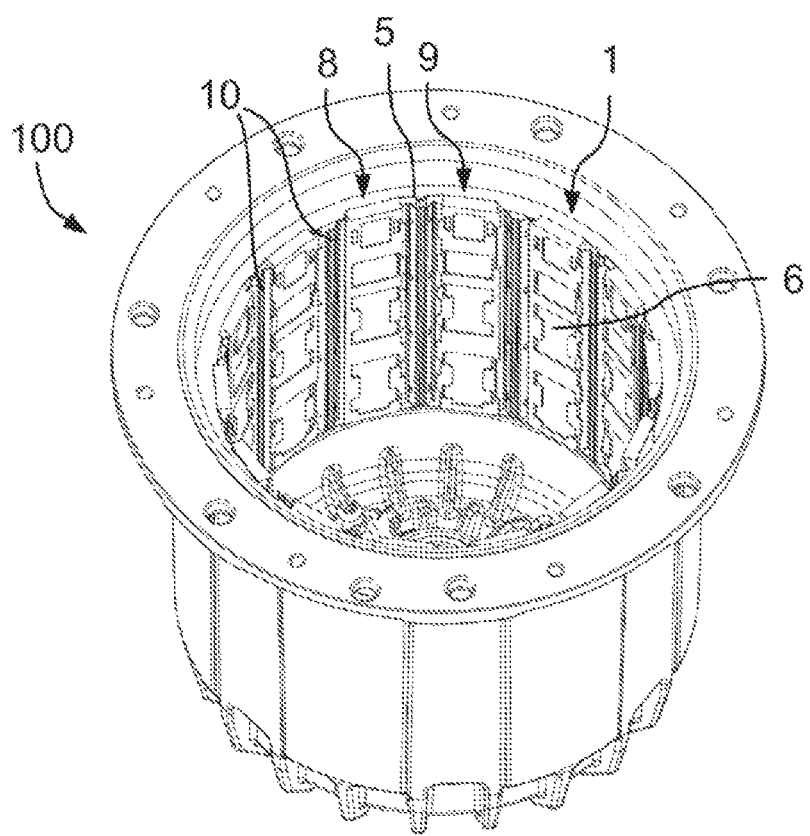
FIG. 5 is a perspective view of a rotor with an inserted plurality of multi-row magnetic element holders.

Insertion of the magnetic element holder 1 from FIG. 2, which is configured as a modular unit, is shown in FIG. 5. A plurality of magnetic element holders 1 are adjacently disposed in the peripheral direction on the inner wall of a rotor 100. It is fastened together and glued to the inner wall of the rotor 100. Like in the embodiment according to FIGS. 1 and 3, the plurality of magnetic element holders 1 are interconnected into a circular unit in the peripheral direction. It is inserted as a whole along the inner wall into the rotor 100.

One spring element 10 is disposed between each two adjacent magnetic element holders 1. The spring element applies a bias to each of the magnetic element holders 1 between each of the row sections 8, 9 and against each of the row sections 8, 9. The spring elements 10 can be a single-part or integral component of each magnetic element holder 1 or row section 8, 9. The spring elements can also be fastened as an additional component to the magnetic element holder 1 or each of the row sections 8, 9. Each of the spring elements 10 extends along the complete edge side axial length of the respective magnetic element holder 1. The spring elements 10 used are those of the embodiment shown in FIG. 3. Thus, refer to the above disclosure regarding their description.

The number of magnetic elements 6 can be freely selected. The size of each of the magnetic element holders 1, disclosed herein, can be adjusted accordingly. Sheet metal or plastic can be used, for example, as material for the magnetic element holder 1. Furthermore, the multi-row configuration of the magnetic element holder 1 is not limited to two row sections.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A magnetic element holder for an electric motor comprising:
   a carrier formed as a frame structure;
   the carrier comprises at least one receiving section for receiving at least one magnetic element, the carrier is configured with a magnetic element holder for positionally fixed holding of the at least one magnetic element inside the at least one receiving section;
   the magnetic element holder is configured to be fastened to a rotor of an electric motor with a plurality of like magnetic element holders forming a modular ring, the magnetic element holder has at least one spring element on its outer edge, a bias can be generated with respect to a magnetic element holder by adjacently positioned spring elements on the outer edge of the adjacent magnetic element holders;
   the magnetic element holder further comprises multiple parallel row sections, each row section having at least one receiving section for at least one magnetic element, the row sections are spaced apart from each other; and
   a hinge provided between the row sections, respectively, the row sections can be movably inclined relative to each other by the hinge.

2. The magnetic element holder according to claim 1, wherein the magnetic element holder is configured as a modular unit.

3. The magnetic element holder according to claim 1, wherein the receiving section comprises multiple receiving pockets disposed in an axial row relative to each other and each pocket configured to receive one magnetic element.

4. The magnetic element holder according to claim 1, where the row sections are interconnected by at least one spring element.

5. The magnetic element holder according to claim 1, wherein the magnetic element holder for positionally fixed holding the at least one magnetic element are connectors into which the magnetic element can be inserted and locked.

6. The magnetic element holder according to claim 1, wherein the spring element is configured in one piece on the magnetic element holder.

7. The magnetic element holder according to claim 1, wherein the spring element has a wave form at least in regions of its cross section, the wave form can be partially elastically compressed and stretched along the wave flow.

8. The magnetic element holder according to claim 1, wherein the spring element substantially extends along the entire edge length of the magnetic element holder.

9. The magnetic element holder according to claim 1, further comprising a tongue disposed on a front face of the magnetic element holder, the tongue can be moved or bent in its position, the tongue can be used to close the adjacent receiving section.

10. The magnetic element holder according to claim 9, wherein the tongue has an optical indicator for a magnetic field orientation of the at least one magnetic element.

11. The magnetic element holder according to claim 1, wherein a magnetic element insertion section is provided, the at least one magnetic element can be inserted into the at least one receiving section, wherein the magnetic element insertion section has an asymmetric cross section on its front face.

12. A rotor of an electric motor having a plurality of magnetic element holders according to claim 1, characterized in that the plurality of magnetic element holders are disposed and fastened adjacent to each other in the peripheral direction on an inner wall of the rotor.

13. The rotor according to claim 12, wherein the plurality of magnetic element holders are at least partially glued to the inner wall of the rotor.

14. The rotor according to claim 12, wherein the plurality of magnetic element holders can be connected into a circular unit in a peripheral direction and inserted as a whole along the inner wall into the rotor.

15. The rotor according to claim 14, wherein a spring element is disposed between each of the magnetic element holders.

16. A magnetic element holder for an electric motor comprising:
a carrier formed as a frame structure;
the carrier comprises at least one receiving section for receiving at least one magnetic element, the carrier is configured with a magnetic element holder for positionally fixed holding of the at least one magnetic element inside the at least one receiving section;
the magnetic element holder is configured to be fastened to a rotor of an electric motor, the magnetic element holder has at least one spring element on its outer edge, a bias can be generated with respect to a magnetic element holder adjacently positioned on the outer edge and the spring element substantially extends along the entire edge length of the magnetic element holder;
the magnetic element holder further comprises multiple parallel row sections, each row section having at least one receiving section for at least one magnetic element, the row sections are spaced apart from each other; and
a hinge provided between the row sections, respectively, the row sections can be movably inclined relative to each other by the hinge.

17. A magnetic element holder for an electric motor comprising:
a carrier formed as a frame structure;
the carrier comprises at least one receiving section for receiving at least one magnetic element, the carrier is configured with a magnetic element holder for positionally fixed holding of the at least one magnetic element inside the at least one receiving section;
the magnetic element holder is configured to be fastened to a rotor of an electric motor, the magnetic element holder has at least one spring element on its outer edge, a bias can be generated with respect to a magnetic element holder adjacently positioned on the outer edge;
the magnetic element holder further comprises multiple parallel row sections, each row section having at least one receiving section for at least one magnetic element, the row sections are spaced apart from each other and a tongue disposed on a front face of the magnetic element holder, the tongue can be moved or bent in its position, the tongue can be used to close the adjacent receiving section; and
a hinge provided between the row sections, respectively, the row sections can be movably inclined relative to each other by the hinge.

18. A magnetic element holder for an electric motor according to claim 17, wherein the tongue has an optical indicator for a magnetic field orientation of the at least one magnetic element.

19. A magnetic element holder for an electric motor comprising:
a carrier formed as a frame structure;
the carrier comprises at least one receiving section for receiving at least one magnetic element, the carrier is configured with a magnetic element holder for positionally fixed holding of the at least one magnetic element inside the at least one receiving section;
the magnetic element holder is configured to be fastened to a rotor of an electric motor, the magnetic element holder has at least one spring element on its outer edge, a bias can be generated with respect to a magnetic element holder adjacently positioned on the outer edge;
the magnetic element holder further comprises multiple parallel row sections, each row section having at least one receiving section for at least one magnetic element, the row sections are spaced apart from each other;
a hinge provided between the row sections, respectively, the row sections can be movably inclined relative to each other by the hinge; and
a magnetic element insertion section is provided, the at least one magnetic element can be inserted into the at least one receiving section, wherein the magnetic element insertion section has an asymmetric cross section on its front face.

* * * * *